(12) United States Patent
Streu et al.

(10) Patent No.: US 11,731,844 B2
(45) Date of Patent: Aug. 22, 2023

(54) APPARATUS AND METHOD FOR SEPARATING INDIVIDUAL BOWLS FROM A STACK OF BOWLS

(71) Applicant: VEMAG Maschinenbau GmbH, Verden/Aller (DE)

(72) Inventors: Nico Streu, Ahausen (DE); Uwe Flammann, Kirchlinteln (DE); Klaus Hiller, Dorverden (DE)

(73) Assignee: VEMAG Maschinenbau GmbH, Verden (DE)

( * ) Notice: Subject to any disclaimer, the term of this patent is extended or adjusted under 35 U.S.C. 154(b) by 62 days.

(21) Appl. No.: 17/324,566

(22) Filed: May 19, 2021

(65) Prior Publication Data
US 2021/0362966 A1  Nov. 25, 2021

(30) Foreign Application Priority Data
May 19, 2020  (DE) .......................... 102020113526.2

(51) Int. Cl.
*B65G 59/06* (2006.01)
(52) U.S. Cl.
CPC .... *B65G 59/061* (2013.01); *B65G 2201/0235* (2013.01)
(58) Field of Classification Search
CPC .......... B65G 59/061; B65G 2201/0235; B65G 59/108; B65G 59/06
(Continued)

(56) References Cited

U.S. PATENT DOCUMENTS

| 2,445,958 | A | * | 7/1948 | Lindstrom | ........... | B65G 59/101 |
| | | | | | | 221/242 |
| 2,692,691 | A | * | 10/1954 | Harriss | ................ | B65G 59/102 |
| | | | | | | 414/797.7 |

(Continued)

FOREIGN PATENT DOCUMENTS

| CA | 1133528 A | 10/1982 |
| DE | 3913589 A1 | 11/1989 |

(Continued)

OTHER PUBLICATIONS

European Patent Office, Extended Search Report issued in EP 21174294.5-1017 dated Oct. 13, 2021 (7 pages).

*Primary Examiner* — Lynn E Schwenning
(74) *Attorney, Agent, or Firm* — Wood Herron & Evans LLP

(57) ABSTRACT

An apparatus is provided for separating individual bowls from a stack of bowls for receiving foodstuffs. The apparatus includes a machine frame for fixing components of the apparatus, a holding device for holding the stack, a separating device for separating individual bowls from the stack, having a separating element, and a drive device. The holding device has at least one bottom carrier element that is mounted in the region of a bottom of a lowermost bowl of the stack moveably by the device such that it temporarily carries the bowl from below and can be moved away from the region of the bottom of the lowermost bowl so that the lowermost bowl can be separated from the stack in a downward direction while the stack remains in the holding device. In addition, a corresponding method is provided of separating a bowl from a stack of bowls for receiving foodstuffs.

12 Claims, 7 Drawing Sheets

(58) Field of Classification Search
USPC .................................................. 414/795.6
See application file for complete search history.

(56) References Cited

U.S. PATENT DOCUMENTS

| | | | |
|---|---|---|---|
| 3,297,201 A | | 1/1967 | Burt |
| 3,741,410 A | * | 6/1973 | Henschke ............ B65G 59/108 221/222 |
| 4,260,311 A | * | 4/1981 | Hanses .................. B31B 50/00 156/196 |
| 4,288,003 A | * | 9/1981 | Fries, Jr. .............. B65G 59/108 221/222 |
| 4,909,412 A | * | 3/1990 | Cerf .................... B65G 59/105 221/221 |
| 4,915,578 A | * | 4/1990 | Becker ................ B65G 59/066 221/253 |
| 4,961,684 A | * | 10/1990 | Provan ................ B65G 59/108 221/222 |
| 11,001,457 B2 | * | 5/2021 | Fickler ................ B65G 59/061 |
| 2007/0278240 A1 | * | 12/2007 | Dideriksen .......... B65G 59/105 221/289 |

FOREIGN PATENT DOCUMENTS

| | | |
|---|---|---|
| DE | 102018100498 A1 | 7/2019 |
| EP | 0045146 A1 | 2/1982 |
| EP | 0267118 A1 | 5/1988 |
| EP | 2799350 A1 | 11/2014 |
| GB | 2402386 B | 7/2006 |

\* cited by examiner

APPARATUS AND METHOD FOR SEPARATING INDIVIDUAL BOWLS FROM A STACK OF BOWLS

CROSS-REFERENCE TO RELATED APPLICATION

This application claims priority to, German Patent Application No. 102020113526.2, filed May 19, 2020. The above-mentioned patent application is incorporated herein by reference in its entirety.

TECHNICAL FIELD

This application relates to an apparatus for separating individual bowls from a stack of a plurality of bowls for receiving foodstuffs, and also relates to a method of separating bowls from such a stack of bowls.

BACKGROUND

Holding devices are known for use in processing bowls for receiving foodstuffs, including separation of bowls from a stack of bowls. The bowl frequently has a radially projecting rim portion and a bottom which are joined by wall regions which typically enlarge upwardly towards the rim to provide a space for the foodstuff to be accommodated therein.

In the state of the art, the holding device generally engages the rim of the bowl. A disadvantage here is that the rim of the bowl can be deformed by virtue of major variations in shape which frequently occur. In the state of the art rotating separating discs are used for individually separating the lowermost bowl from the stack in order for them to pass into a gap between the rims of adjacent bowls. By virtue of the above-described discrepancies in the shape of the rims (misshapen rims) and greater weights of the entire stack the known apparatuses frequently do not succeed in cleanly separating the lowermost bowl for the separating disc frequently does not find the gap and therefore damages parts of the bowls so that the operation of removing bowls from the stack is interrupted.

As a result, it would be desirable to provide an apparatus for and a method of separating bowls from a stack, which operate more reliably.

SUMMARY

These and other technical objects and problems are addressed by the embodiments provided in this invention. A first embodiment of the invention provides an apparatus including a machine frame for fixing components of the apparatus, a holding device for holding the stack, and a separating device for separating individual bowls from the stack, having a separating element adapted to come into engagement with the respective lowermost bowl of the stack. In the apparatus, the holding device has at least one bottom carrier element for temporarily carrying the stack, that is mounted in the region of the bottom of the lowermost bowl of the stack moveably by a drive device and which is so adapted that it temporarily carries the stack from below and can be moved away from the region of the bottom of the lowermost bowl so that the lowermost bowl can be separated from the stack in a downward direction while the stack without the lowermost bowl remains in the holding device, and there is provided a drive device for moving the bottom carrier element.

According to embodiments of the invention, the apparatus has a so-called bottom carrier element which temporarily carries the stack. The bottom carrier element is so controlled in its movement and is of such a configuration that it can preferably be moved under the lowermost bowl in such a way that it temporarily comes into contact with the lowermost bowl at the bottom thereof and temporarily completely or very extensively supports the weight of the entire stack. Preferably the bottom carrier element is moved into the region of the bottom of the lowermost bowl at the moment at which the at least one separating element of the separating device for separating individual bowls, here the lowermost bowl from the remainder of the stack, seeks to move in between the lowermost and the second lowermost bowl in order to implement separation. The stack is properly oriented by the bottom carrier element at a crucial moment in the separation process by the bottom carrier element or a plurality of bottom carrier elements supporting the entire stack. At that moment the separating element can then be very well moved in between the bowls to be separated, that is to say it can be so-to-speak threaded thereinto. Advantageously the bottom carrier element makes use of the fact that the region of the bottom on the one hand has lesser shape discrepancies than the rims of the bowl and it is also of a larger area so that it is possible to achieve better orientation of the lowermost bowl and thus the entire stack in comparison with the previously known separating apparatuses in which the stack is generally or exclusively carried in the region of the rim of the bowl or bowls by suitable components of the apparatus. According to embodiments of the invention, for moving the bottom carrier element use is made of a drive device which optionally alternatively can implement different paths of movement of the bottom carrier element. By way of example and preferably by the drive device and suitable mountings, the bottom carrier element can be moved by a rotary movement into the region of the lowermost bowl or out of the region of the lowermost bowl in the further proceedings; alternatively however it is also possible to implement a translatory movement of the bottom carrier element by the drive device and suitable mountings, for example a linear guide arrangement. Other paths of movement are also in accordance with the invention. The invention in embodiments thereof therefore synergistically uses the bottom carrier element or also the plurality thereof, which are moveable as described hereinbefore, together with a separating element of the separating device in conjunction with a drive device with associated mountings for the components, in particular the bottom carrier element.

According to a second embodiment of the invention, a method is provided of separating a bowl from a stack of bowls for receiving foodstuffs, preferably using an apparatus as set forth above. In the method, (a) a stack comprising a plurality of bowls is provided in a holding device of an apparatus for separating individual bowls from the stack, (b) the stack in a first phase is temporarily carried by at least one bottom carrier element mounted in the region of the bottom of the lowermost bowl of the stack moveably by a drive device, (c) the at least one bottom carrier element is moved out of the region of the bottom of the lowermost bowl of the stack, (d) then the lowermost bowl is separated downwardly from the stack by virtue of a force directed away from the stack, and (e) the stack is temporarily carried above the lowermost bowl to be separated by a carrier portion of the separating apparatus for temporarily carrying the stack by engagement of the carrier portion at a rim of the bowl from below, preferably when the bottom carrier element is out of engagement from the bottom of the lowermost bowl to be separated.

The method according to embodiments of the invention achieves substantially the same effects and advantages as those attained by the separating apparatus according to the invention; in that respect and for the avoidance of repetition reference is directed in its entirety also to the foregoing description for the method according to the invention.

Advantageous developments of the separating apparatus according to the invention and also the separating method according to the invention will also be apparent from the description hereinafter.

In a particularly preferred embodiment it is proposed that there are provided a plurality of moveably mounted bottom carrier elements which are adapted to temporarily jointly carry the stack and are moveable out of the region of the bottom of the lowermost bowl. Because a plurality of bottom carrier elements cooperate substantially synchronously with each other the bottom of the lowermost bowl can be engaged by a plurality of bottom carrier elements and thus the entire stack can be temporarily carried in very well oriented relationship. That is advantageous for separation of the lowermost bowl by the separating element or also a plurality thereof being consequently threaded between the bowls as satisfactorily as possible and in very accurately fitting relationship, preferably into a gap between the rims of the lowermost and second lowermost bowl. In that way for example two substantially mutually opposite bottom carrier elements or also three distributed bottom carrier elements or also particularly preferably four bottom carrier elements can be provided according to the invention.

In a further preferred embodiment it is provided that the drive device for moving the bottom carrier element has a rotatably mounted shaft and the bottom carrier element is arranged at the shaft and is in the form of a radially protruding projection with respect to the axis of rotation of the shaft. By such a rotatably mounted shaft and a bottom carrier element suitably fixed thereto the latter can be involved in the advantageous pattern of movement of a rotary motion temporarily for carrying the lowermost bowl and in total the stack of bowls disposed thereabove. The bottom carrier element does not need to be respectively individually accelerated or decelerated but can be moved at an adjustable substantially constant or also variable speed of rotation into the region of the bottom of the lowermost bowl and also out of that region again, by rotation. The shaft or preferably also a plurality of shafts each having at least one bottom carrier element fixed thereto can be supported in a structurally simple and secure fashion, with two bearings and preferably by way of a so-called floating cantilever bearing in which the bottom carrier element is therefore fixed beyond the bearings at a projecting shaft portion.

A particularly preferred development or alternative configuration of the invention provides that the bottom carrier element is preferably fixable to the shaft in a plurality of different axial positions with respect to the axis of rotation in a given region in an axial and/or radial and/or tangential respect. Particularly preferably the arrangement provides for displaceability or adjustability of the bottom carrier element in different axial positions, therefore with respect to the axis of rotation or the longitudinal axis of the shaft. By virtue of that adjustability in the axial direction, the bottom carrier element can be adapted to bowls of different dimensions, therefore for example bowls of vertical spacings of different magnitudes between the rim region which usually projects laterally radially from the bowl in the manner of a flange, and the bottom region of the bowl.

A preferred development is distinguished in that the bottom carrier element is fixable in various axial positions by an axially extending recess in the shaft, wherein preferably the shaft is at least portion-wise in the form of a hollow shaft and/or the bottom carrier element can be steplessly secured in various axial positions by a screw. A recess, for example a groove, a longitudinal groove or also a slot in a preferred hollow shaft allows the fitment of fixing means, for example screws, nuts or other fixing means for simply fixing or also releasing the bottom carrier element for adjustment of the position on the shaft, in particular the axial position. The recess therefore extends in the direction of the desired adjustment, in particular therefore in the axial direction.

A further preferred embodiment provides that the bottom carrier element is configured in the manner of a plate-shaped wing and is of a width less than the outside diameter of the shaft in the region in which the bottom carrier element is fixed to the shaft. The wing preferably projects substantially radially and can be of a shape advantageously adapted to the purpose according to the invention of supporting the stack, for example it can be of a shape which enlarges with increasing spacing from the axis of rotation at any event partially outwardly, in the manner of an enlarging wing, and/or in the manner of a segment of a circle, partially advantageously adapted in the view at a right angle or in some other fashion. The width of the wing, preferably measured or viewed in a side view in a direction towards the axis of rotation, in particular in the case of a hollow shaft which is preferred, can be less than the diameter of the shaft, in particular the hollow shaft.

A further preferred embodiment is distinguished in that two to four shafts each with a bottom carrier element fixed thereto are mounted to the machine frame and are drivable synchronously by the drive device so that two to four bottom carrier elements temporarily carry the stack or are synchronously moved out of the region of the bottom of the lowermost stack so that the lowermost bowl can be separated. Four shafts arranged substantially in a square or rectangle, viewed from above, are particularly preferred so that a uniform support function is afforded by four corresponding bottom carrier elements so that particularly advantageous separation is made possible. Other arrangements are also conceivable according to the invention, for example three shafts arranged in a triangle as viewed from above.

It is particularly desirable if the shaft or shafts and the holding device are so mounted to the machine frame that in operation the shafts and the stack are arranged substantially vertically. In that way gravity can provide optimum assistance for separation of the lowermost bowl and it is possible to ensure that the separating element is inserted into the gap between the bowls in the optimum fashion.

A further preferred development of the invention provides that the shaft or shafts are driven by a single drive of the drive device and are drivable by a transmission, preferably by a toothed belt or chain transmission. A single drive facilitates structural implementation and expenditure and at the same time provides for good synchronization of the movement of the bottom carrier elements in such a way that they temporarily simultaneously cooperate with the bottom of the lowermost bowl and perform the carrier function while in another phase they are moved uniformly out of the region of the bottom of the lowermost bowl to be able to separate the lowermost bowl downwardly and move it away from the stack.

It is further particularly preferred that the separating element of the separating device is arranged axially spaced with respect to the axis of rotation in operation above the bottom carrier element on the shaft and is of such a configuration that it applies to the lowermost bowl a force directed away from the remainder of the stack when the bottom carrier element temporarily releases the lowermost bowl to promote separation of the lowermost bowl from the stack. By virtue of such a configuration a positive downwardly directed force can be exerted on the lowermost bowl to be separated after the bottom carrier elements have been moved into their passive position again. Gravity and the additional force thus effectively cooperate.

A particularly preferred development provides that the separating element is in the form of a spiral extending at least portion-wise in a spiral configuration around the outer periphery of the shaft for applying a force to the lowermost bowl to be separated downwardly. By virtue of such a spiral-shaped, radially projecting spiral it is possible in a given phase in respect of time to apply the additional separating force directed downwardly to the lowermost bowl. Preferably the separating element has a flat spiral-shaped projection which extends axially in a direction towards the bottom carrier element and which is adapted during rotation of the shaft to apply a downwardly directed force from above to the rim of the bowl to be separated. Desirably the separating element is in the form of a separating plate member.

A preferred embodiment is further characterised in that the spiral-shaped separating element, in particular the separating plate member, is elastically deformable and can be set to different lengths in the axial direction. With that manner of elastic deformability the spiral-shaped separating element can be adjusted for bowls of different sizes, in particular bowls involving different axial spacings between the rim and the bottom.

It is particular preferred if the elastically deformable separating element is coupled with its lower end region to the bottom carrier element which is preferably fixable in different axial positions. Such a mechanical coupling affords a synergy effect such that at the same time by adjustment of the bottom carrier element in the axial direction, the preferably spiral-shaped separating element is also adjusted and adapted to the spacing between the rim and the bottom of a bowl. Adjustment is thus reliably possible while involving a shorter amount of time.

A further preferred embodiment provides that provided on the shaft in adjacent relationship with the separating element is a radially projecting carrier portion for temporarily carrying the stack, which is adapted to carry the stack temporarily by engagement at a rim of the bowl from below, preferably or as a preference whenever the bottom carrier element is out of engagement from the bottom of the lowermost bowl to be separated. While the bottom carrier elements are in their passive position and are not supporting the lowermost bowl and thus the entire stack an additional carrier function is advantageously needed for the entire stack and this is preferably afforded by the one or also additional radially projecting carrier portions. The carrier portion can be of such a configuration and can also preferably be arranged or fixed on the shaft in such a way that it comes into a condition of supporting the stack in the truest sense when the bottom carrier element or elements is or are temporarily moved out of the region of the bottom of the lowermost bowl.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Mutually corresponding parts are denoted by the same references in all the Figures.

Figure 1:
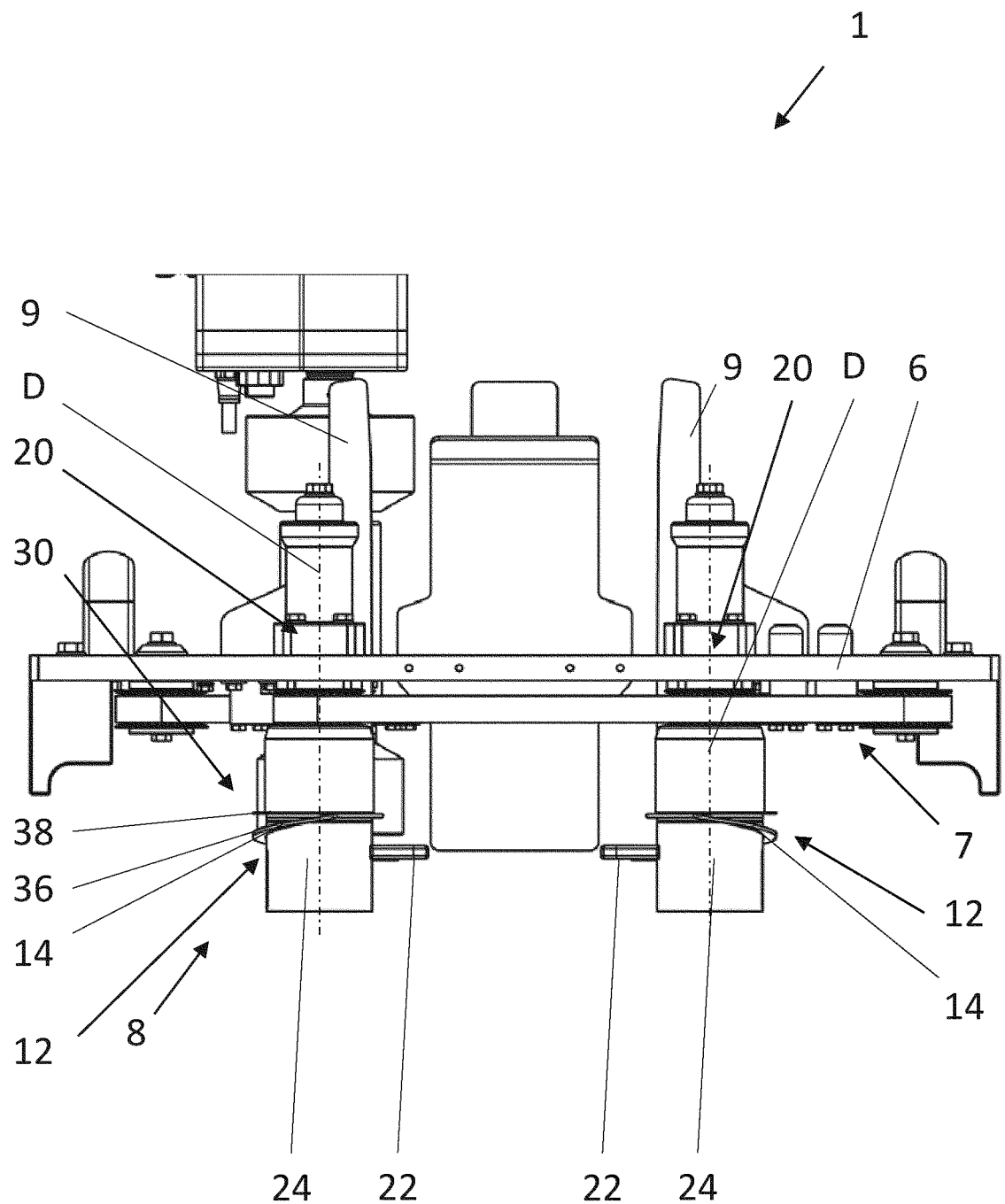
FIG. 1 shows a front view of a separating apparatus according to one embodiment of the invention.
Figure 2:
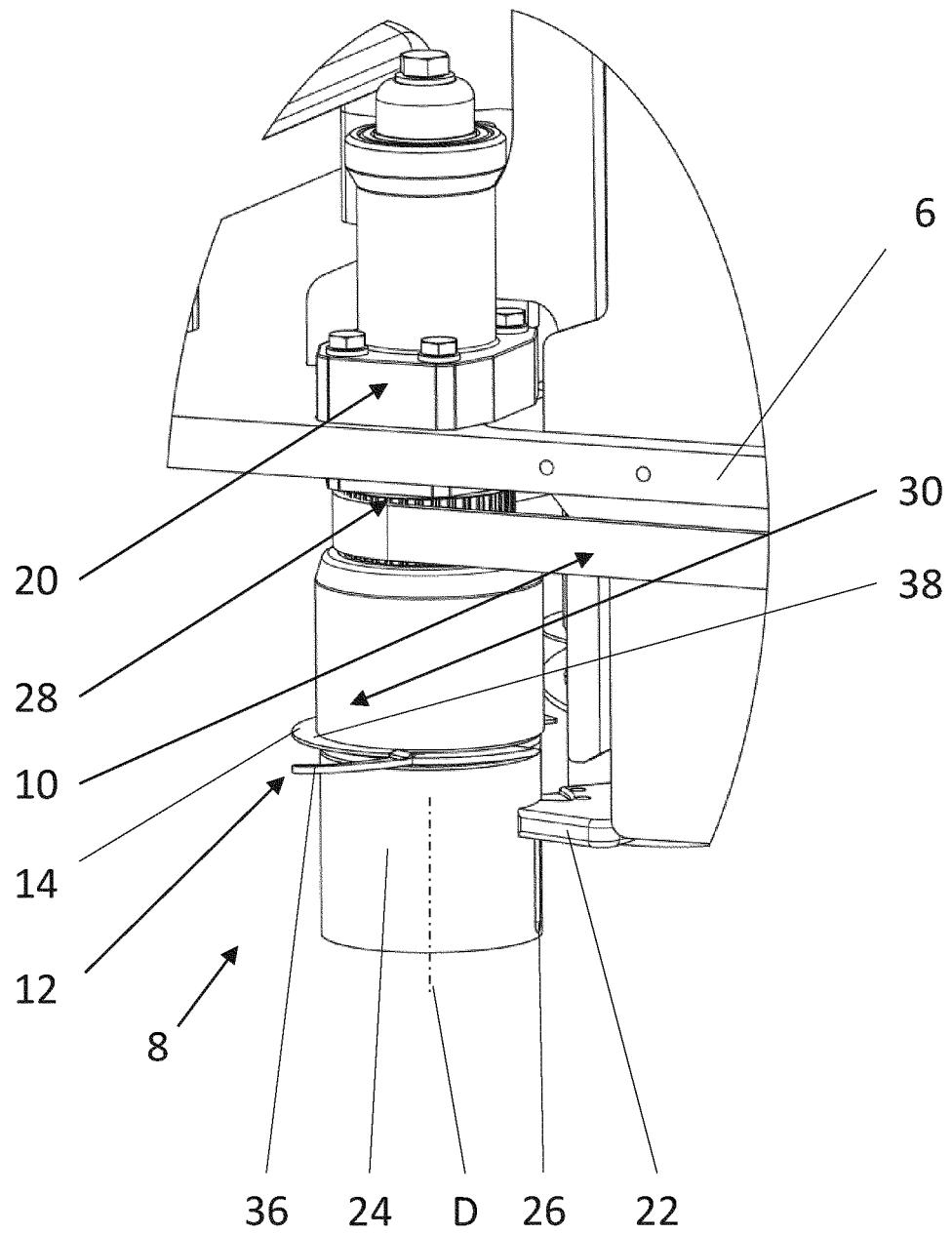
FIG. 2 shows a perspective detail view of a portion of the separating apparatus of FIG. 1.
Figure 3:
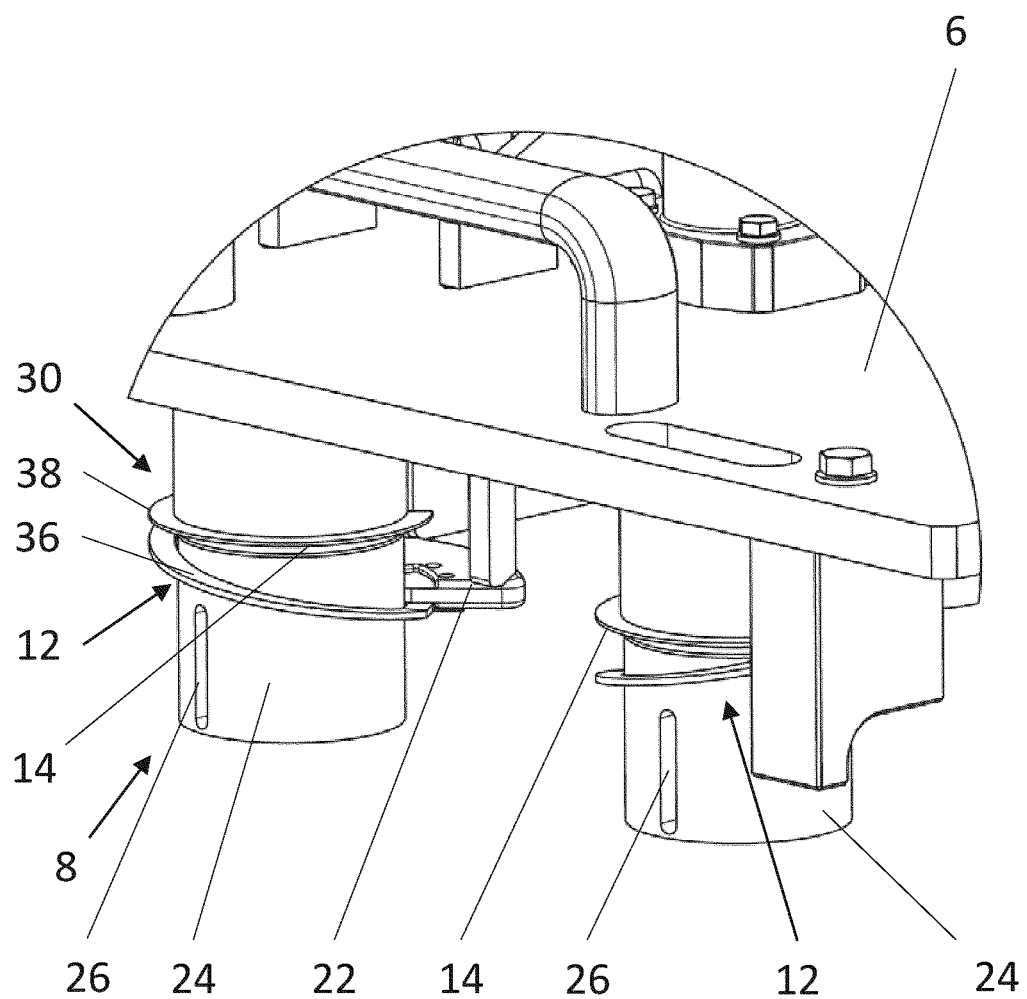
FIG. 3 shows another perspective detail view of a portion of the separating apparatus of FIG. 1.

FIG. 1 shows an apparatus 1 for separating individual bowls 4 (see FIG. 4) from a stack 2. The apparatus 1 has a machine frame 6 for fixing the components of the apparatus, in the form of a base plate. The apparatus 1 includes a holding device 8 for holding the stack 2.

Figure 4:
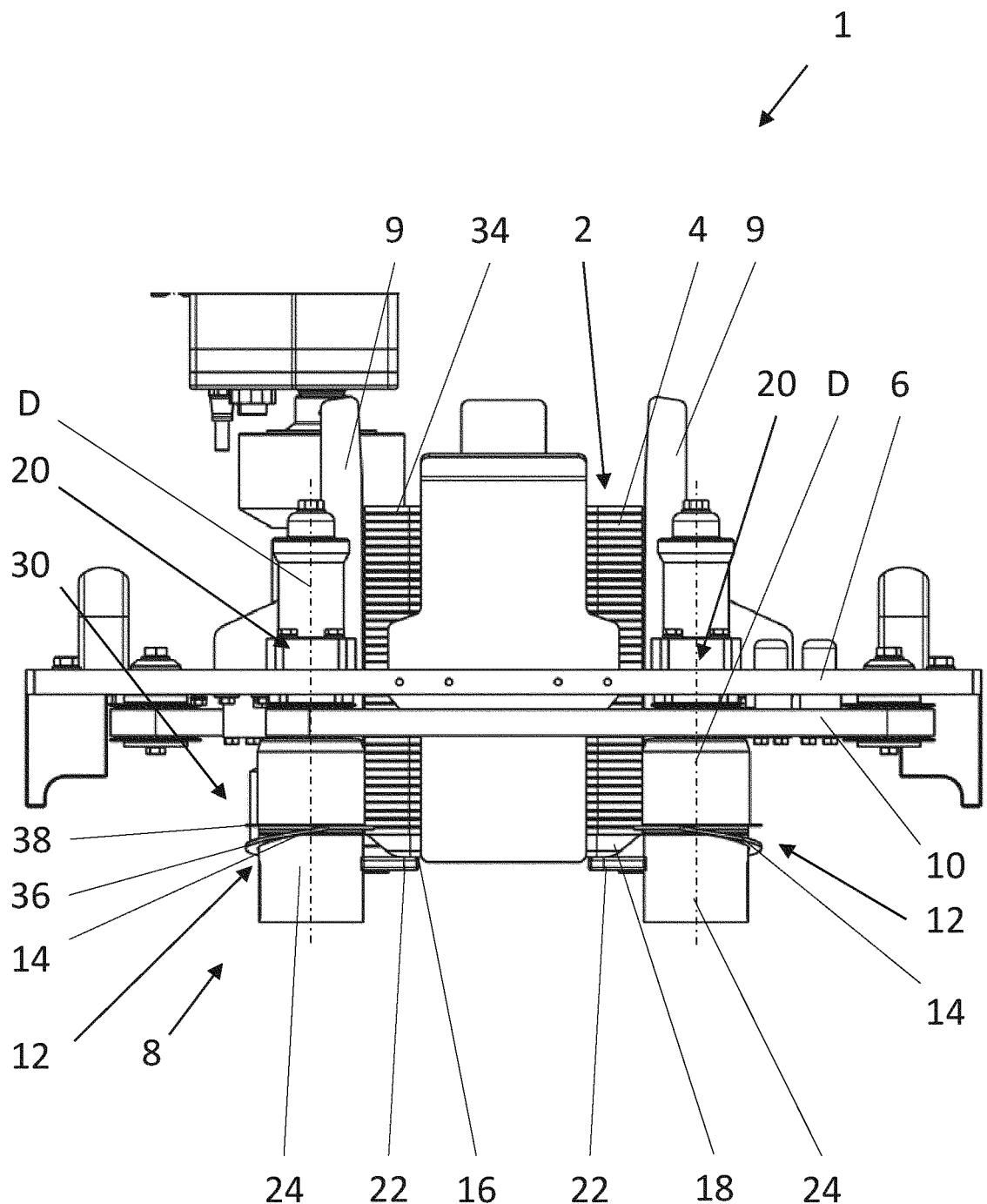
FIG. 4 shows a front view of the separating apparatus of FIG. 1 with the stack of bowls.

The holding device 8 has a plurality, in the illustrated embodiment four, guides 9 which extend substantially perpendicularly relative to the base plate and approximately parallel to a longitudinal axis D of a plurality of shafts 24 and which are arranged vertically in operation and which laterally support or guide the stack 2, see FIGS. 1 and 4.

The machine frame 6 has a mounting base plate having a plurality of recesses, threads or the like for arranging the components and serves for carrying a plurality of shafts 24 which are part of a drive device 7 for moving the bottom carrier element 22 or, as in the illustrated embodiment, a plurality of bottom carrier elements 22.

Figure 7:
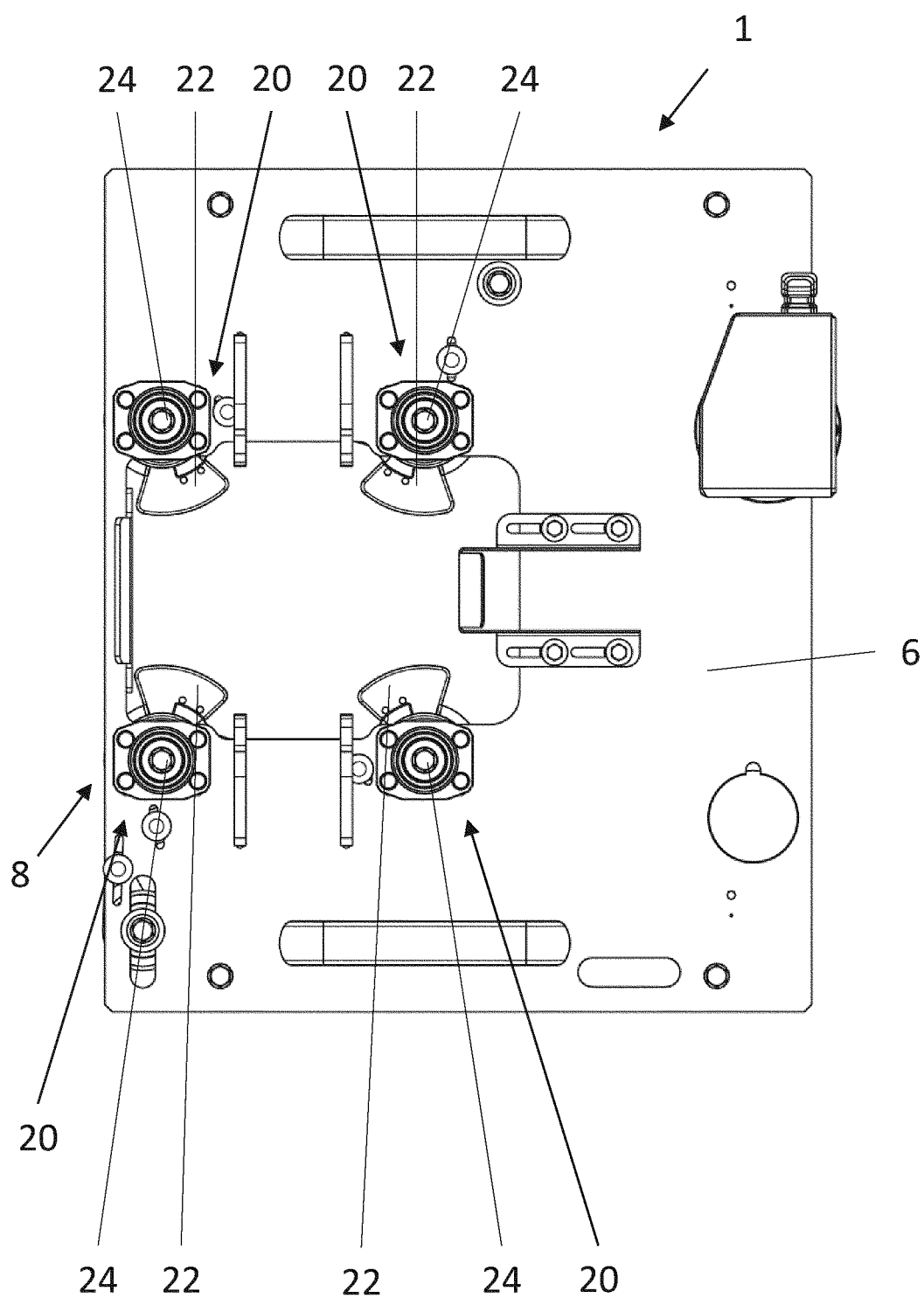
FIG. 7 shows a plan view of the separating apparatus of FIG. 1.

Each shaft 24 is mounted in cantilever relationship by two bearings 20, 21 on the mounting base plate of the machine frame 6, more specifically in such a way that the respective axes of rotation or longitudinal axes D extend perpendicularly to the base plate. The bearing 20 is fixed by a screw connection to the base plate of the machine frame 6. The second bearing 21 (not visible) is respectively arranged in a cylindrical tube 23. The shaft 24 extends from the part arranged above the base plate within the tube 23 and further into a lower portion below the base plate. In the preferred embodiment four shafts 24 are mounted to the machine frame 6. The four shafts 24 are arranged on the base plate of the machine frame 6 in a rectangle in a plan view (see FIG. 7), that is to say at each corner of the rectangle there is a shaft 24, see in that respect also FIG. 7. The shafts 24 are in the form of a hollow shaft at any event in part, in the illustrated embodiment in the part below the base plate. For that purpose a further shaft can be fixed to the inner shaft supported by the bearings 20, 21, beneath the base plate, the further shaft being visible there from the exterior in the Figures. The shafts 24 are driven by a toothed belt 10 which is part of the drive device 7 and are thus caused to rotate during the separation operation. In the illustrated embodiment all four shafts 24 are jointly driven by a drive (not shown). Each shaft 24 is provided with a gear 28, by which the force of the drive is transmitted to the shaft or shafts 24. For that purpose the toothed belt 10 is in engagement with the gears 28. This therefore forms a transmission for transmission of the power from the drive to the drive device 7 and thus for movement of the bottom carrier element 22.

Figure 5:
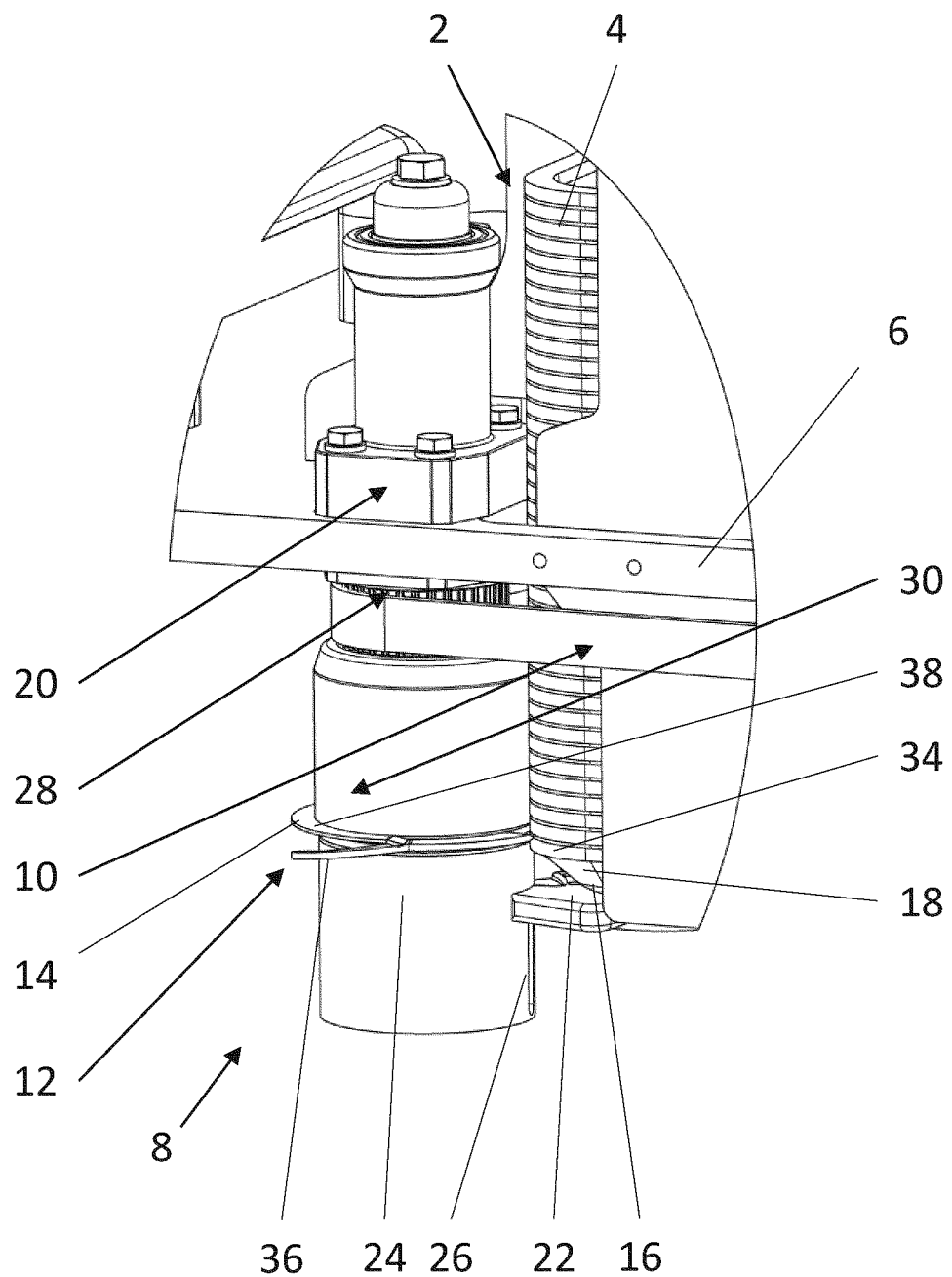
FIG. 5 shows a perspective detail view (similar to FIG. 2) of the separating apparatus of FIG. 1 with the stack of bowls.
Figure 6:
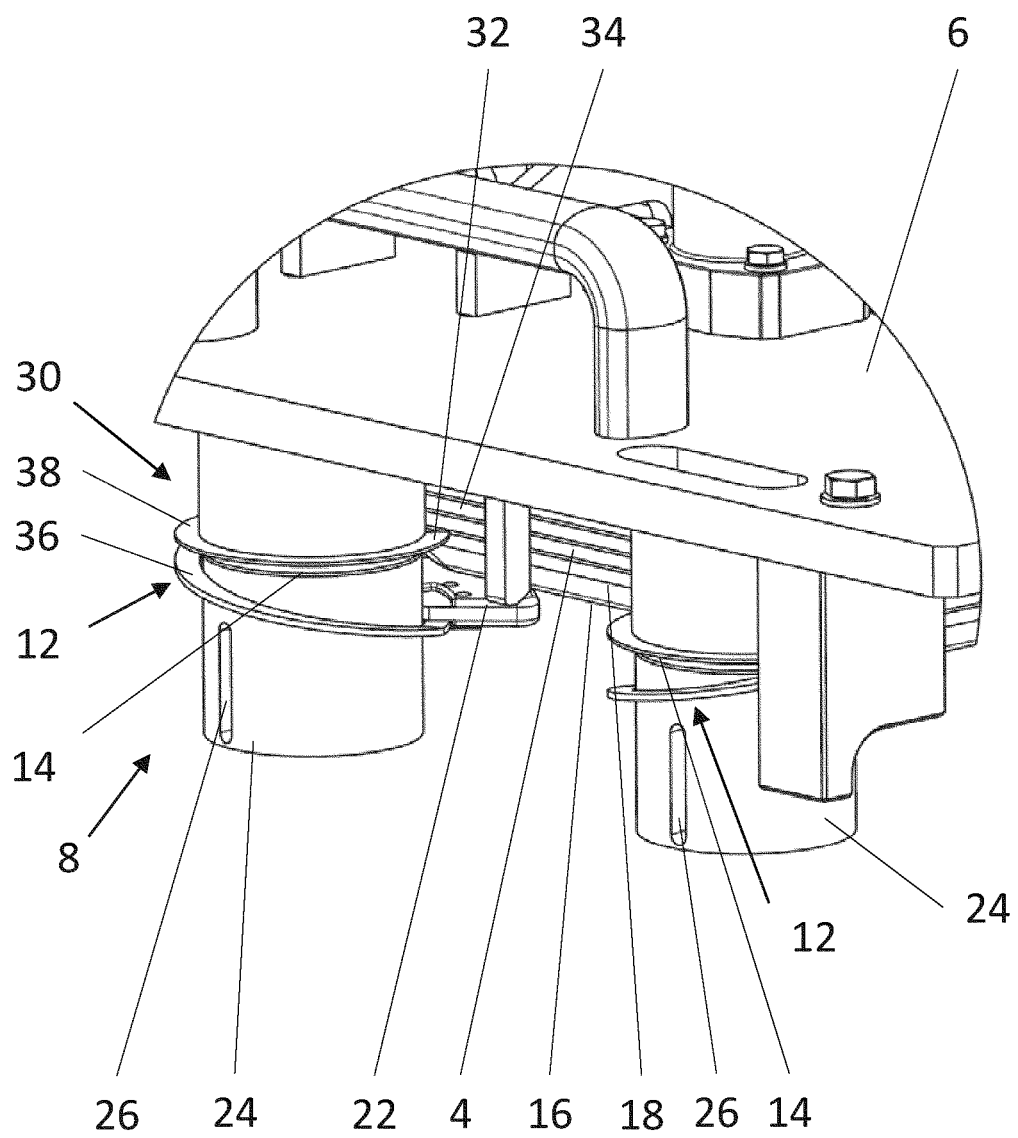
FIG. 6 shows another perspective detail view (similar to FIG. 5) of the separating apparatus of FIG. 1 with the stack of bowls.

The holding device 8 for holding the stack 2 has at least one moveable bottom carrier element 22, in the illustrated embodiment four thereof, for carrying the stack 2. That function is performed by the bottom carrier element or elements 22 at least temporarily, in particular during the separation process. FIGS. 4 to 6 show how the stack 2 is supported. The bottom carrier element 22 is in the form of a projection on the shaft 24. The bottom carrier element 22 is arranged perpendicularly to the axis of rotation D of the shaft 24 at the peripheral surface thereof. In this embodiment the bottom carrier element 22 is of a plate-shaped structure, in which case the shape of the plate extends trapezoidally from the shaft 24 with the wide side at the side facing away from the shaft 24. The shape of the bottom carrier element 22 can also be seen in FIG. 7.

FIGS. 4 to 6 show the apparatus 1 with a stack 2 comprising a multiplicity of bowls 4. The stack 2 is arranged in the apparatus 1 perpendicularly to the base plate of the machine frame 6 or parallel to the axes of rotation D of the shafts 24. The holding device 8 carries the stack 2 by the bottom carrier elements 22 from below. In other words the bottom carrier element 22, when carrying the stack 2, is in contact with the bottom 16 of the lowermost bowl 18 and carries—vertical—forces due to the weight of the stack 2. In this embodiment a bottom carrier element 22 is rotatably moveably arranged at respective ones of the four shafts 24. Due to the shafts 24 being arranged in a rectangle on the base plate the bottom carrier elements 22 are also arranged in a rectangle. The bottom carrier elements 22 are each arranged at the same height on the shafts 24. Thus in the illustrated embodiment the bottom carrier elements 22 are suitable for holding substantially rectangular bowls. In that respect each bottom carrier element 22 carries a respective corner region of the bottom 16 of the lowermost bowl 18 so that the stack 2 is held uniformly by all bottom carrier elements 22. For bowls 4 of different geometries either the shaft arrangement on the base plate is to be suitably adapted or the shape of the bottom carrier elements 22 so that the bottom 16 of the bowl 4 is held uniformly and horizontally in the apparatus 1. The bottom carrier elements 22 are of a rotatable configuration so that they temporarily come into contact with the bottom of the lowermost bowl 4 of a stack in order to temporarily support the stack 2 from below. In a manner not shown here the one bottom carrier element 22 or a plurality thereof, instead of being rotatable, can also be moveable with a translatory movement in order to temporarily come into contact with the bottom of the lowermost bowl 4 of a stack to temporarily support the stack 2 from below.

The apparatus 1 further includes a separating device 12 for separating individual bowls out of the stack, in particular the respective lowermost bowl 4 in the stack 2. For that purpose the separating device 12 has a moveable separating element 14 which can be moved between two bowls 4, in particular the lowermost bowl 4 and the second from bottom bowl 4 between the peripherally extending rim regions thereof, being as it were threaded into the gap. The separating element 14 is in the form of a spiral 30 and is also mounted by the shaft 24 rotatably about the axis of rotation D. The separating element 14 extends perpendicularly to the axis of rotation D of the shaft 24 at the peripheral surface of the shaft 24, in the embodiment illustrated in the region of the portion of the shaft 24, which is in the form of a hollow shaft. The separating element 14 is of a strip-shaped configuration and is of a thickness which is equal to or less than an axial spacing between two bowl edges 34 in the stack 2. In that way during the separating process the separating element 14 can engage between two bowls 4, in particular two bowl edges 34.

The spiral 30 is arranged in a spiral configuration around the shaft 24. Starting from the bottom carrier element 22 the spiral 30 winds with a constant pitch around the peripheral surface of the shaft 24. The spiral 30 is made from such a material as for example and metal or plastic and is of such dimensions that it is elastically deformable, in particular in the direction of its axial extent in the direction of the axis of rotation D. The spiral 30 has a first partial turn 36 and a second partial turn 38. The first partial turn 36 is of a constant pitch and extends from the bottom carrier element 22 on the peripheral surface of the shaft 24 with an incomplete or a complete turn around the shaft 24 into the second partial winding 38. The spiral 30 ends with the second partial winding 38 with a ring which extends partially, preferably completely, around the shaft 24, the ring extending without a pitch gradient. The separating element 14 is adapted to come into contact from above with the lowermost bowl 18 in the rim region thereof, in particular the separating element 14 engaging into the stack 2 between the lowermost bowl 18 and the bowl 4 disposed above same. A force can be applied from above downwardly by the separating element 14 by the engagement against the lowermost bowl 4 to be separated, in order to separate the lowermost bowl 4 from the remaining stack 2 disposed thereabove in a downward direction. At that moment of separation the bottom carrier elements 22 are not in the path of movement of the lowermost bowl 4, but are moved out of same into a passive position.

The bottom carrier elements 22 are mounted to the shaft 24 also moveably in the axial direction, that is to say the direction of the axis of rotation D, and can be fixed in different axial positions, see in this respect FIG. 6. For that purpose a recess 26 is provided in the shaft, in particular the hollow shaft 24. That recess 26 is in the form of a slot in the shaft 24. The slot is continuous in the shaft 24. The bottom carrier element 22 is adjustable in its height by the recess 26, in particular in the direction of an axis parallel to the axis of rotation D of the shaft 24. In this embodiment fixing of the bottom carrier element 22 is effected by a screw connection at the recess 26 in the shaft 24. In that way the position of the bottom carrier element 22 is steplessly adjustable in height. In that way the spacing between the separating element 14, in the illustrated embodiment therefore the spiral 30, in particular the second partial winding 38 of the spiral 30, and the bottom carrier element 22 is adjustable. That makes it possible to use the apparatus 1 for bowls 4 with a rim at differing heights. So that the transition from the bottom carrier element 22 extends continuously into the first partial winding 36 of the spiral 30 the separating element 14, in particular the first partial winding 36, is elastically deformable, as also described hereinbefore. The second partial winding 38 is fixed in its position on the peripheral surface of the shaft 24.

The second upper partial winding 38 of the spiral 30 is temporarily provided to carry the stack 2 and thus forms a carrier portion 32. Firstly in a phase during operation the bottom carrier element 22 temporarily carries the entire stack 2. For that purpose the bottom 16 of the lowermost bowl 18 rests on the top side of the bottom carrier element 22. When the shaft 24 is driven the bottom carrier element 22 moves away from the stack 2. In that way the contact or connection of the bottom carrier element 22 to the bottom 16 of the lowermost bowl 18 is released. At the same time the separating element 14, in particular the second partial winding 38, moves into or is in the position between the top side of the rim 34 of the lowermost bowl 18 and the underside of the rim 34 of the bowl 4 above it. As soon as the bottom carrier element 22 is out of contact with the stack 2 the carrier portion 32 (FIG. 6) of the second partial winding 38 of the carrier element 22 carries the stack 2 by way of the lowermost bowl 18. At the same time, with the rotary movement of the shaft 24, the first partial winding 36 of the separating element 14 moves towards the stack so that the lowermost bowl 18 is released from the stack by the guidance action at the first partial winding 36 with its falling pitch gradient and is transported away downwardly by an applied force.

In operation therefore the following procedure or the following method is performed: a method of separating a bowl 4 from a stack 2 of bowls 4 for receiving foodstuffs, using an apparatus 1 using an apparatus 1 as described hereinbefore, wherein (a) a stack 2 comprising a plurality of bowls 4 is provided in a holding device of the apparatus 1, (b) the stack 2 in a first phase is temporarily carried by at least one bottom carrier element 22 mounted in the region of the bottom 16 of the lowermost bowl 18 of the stack 2 moveably by a drive device, (c) the at least one bottom carrier element 22 is moved out of the region of the bottom of the lowermost bowl 18 of the stack 2, (d) then the lowermost bowl 18 is separated downwardly from the stack 2 by virtue of a force directed away from the stack 2, and (e) the stack 2 is temporarily carried above the lowermost bowl 18 to be separated by a carrier portion 32 of the separating apparatus 1 for temporarily carrying the stack by engagement of the carrier portion 32 at a rim of the bowl 34 from below, when the bottom carrier element 22 is out of engagement from the bottom 16 of the lowermost bowl 18 to be separated.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A separating apparatus for separating individual bowls from a stack of bowls for receiving foodstuffs, comprising:
   a machine frame for fixing components of the apparatus,
   a holding device for holding the stack,
   a separating device for separating individual bowls from the stack, the separating device having a separating element adapted to come into engagement with the respective lowermost bowl of the stack, and
   a drive device,
   wherein the holding device has a bottom carrier element for temporarily carrying the stack, the bottom carrier element being selectively positioned by the drive device to be in a region of a bottom of a lowermost bowl of the stack, the bottom carrier element being so adapted that it temporarily carries the stack from below by contacting the bottom of the lowermost bowl, and the bottom carrier element can then be moved away by the drive device from the region of the bottom of the lowermost bowl, such that the lowermost bowl can be separated from the stack in a downward direction while the stack without the lowermost bowl remains in the holding device,
   wherein the drive device is configured to move the bottom carrier element, the drive device has a rotatably mounted shaft that moves the bottom carrier element, and the bottom carrier element is arranged at the shaft and is in the form of a radially protruding projection with respect to an axis of rotation of the shaft, and
   wherein the separating element of the separating device is arranged axially spaced with respect to an axis of rotation in operation above the bottom carrier element on the shaft and is of such a configuration that it applies to the lowermost bowl a force directed away from a remainder of the stack when the bottom carrier element temporarily releases the lowermost bowl to support separation of the lowermost bowl from the stack.

2. The separating apparatus of claim 1, wherein the apparatus includes a plurality of moveably mounted bottom carrier elements which are adapted to temporarily jointly carry the stack and are moveable out of the region of the bottom of the lowermost bowl.

3. The separating apparatus of claim 1, wherein the bottom carrier element is fixable to the shaft in a plurality of different axial positions with respect to the axis of rotation.

4. The separating apparatus of claim 3, wherein the bottom carrier element is fixable in various axial positions by an axially extending recess in the shaft, wherein at least a portion of the shaft is in the form of a hollow shaft.

5. The separating apparatus of claim 1, wherein the bottom carrier element is a plate-shaped wing and is of a width less than an outside diameter of the shaft in the region in which the bottom carrier element is fixed to the shaft.

6. The separating apparatus of claim 1, wherein two to four shafts each with a bottom carrier element fixed thereto are mounted to the machine frame and are drivable synchronously so that two to four bottom carrier elements temporarily carry the stack or are synchronously moved out of the region of the bottom of the lowermost stack so that the lowermost bowl can be separated.

7. The separating apparatus of claim 6, wherein the shafts and the holding device are so mounted to the machine frame that in operation the shafts and the stack are arranged substantially vertically.

8. The separating apparatus of claim 7, wherein the shafts are driven using a transmission, including a toothed belt or chain transmission.

9. The separating apparatus of claim 1, wherein the separating element is in the form of a spiral extending in a spiral configuration around at least a portion of an outer periphery of the shaft for applying a force to the lowermost bowl to be separated downwardly.

10. The separating apparatus of claim 9, wherein the separating element has a flat spiral-shaped projection which extends axially in a direction towards the bottom carrier element and which is adapted during rotation of the shaft to apply a downwardly directed force from above to a rim of the bowl to be separated.

11. The separating apparatus of claim 1, wherein the separating element also defines a radially projecting carrier portion for temporarily carrying the stack, the carrier portion being adapted to carry the stack temporarily by engagement at a rim of the bowl from below, including when the bottom carrier element is out of engagement from the bottom of the lowermost bowl to be separated.

12. A method of separating a bowl from a stack of bowls for receiving foodstuffs, comprising:

(a) providing a stack comprising a plurality of bowls in a holding device of an apparatus for separating individual bowls from the stack,
(b) carrying the stack temporarily by a bottom carrier element selectively positioned by a drive device to be in a region of a bottom of a lowermost bowl of the stack, the bottom carrier element being in contact with the bottom of the lowermost bowl while carrying the stack,
(c) moving the bottom carrier element by the drive device out of the region of the bottom of the lowermost bowl of the stack,
(d) separating the lowermost bowl downwardly from the stack by virtue of a force directed away from the stack, the force applied by a separating apparatus, and
(e) carrying the stack temporarily above the lowermost bowl by a carrier portion of the separating apparatus, specifically by engagement of the carrier portion at a rim of the bowl from below, the rim of the bowl being spaced apart from the bottom of the bowl wherein the drive device has a rotatably mounted shaft that moves the bottom carrier element at steps (b) and (c), and the bottom carrier element is arranged at the shaft and is in the form of a radially protruding projection with respect to an axis of rotation of the shaft, and wherein the separating apparatus is arranged axially spaced with respect to an axis of rotation in operation above the bottom carrier element on the shaft and is of such a configuration that it applies at step (d) to the lowermost bowl a force directed away from a remainder of the stack when the bottom carrier element temporarily releases the lowermost bowl to support separation of the lowermost bowl from the stack.

* * * * *